March 28, 1967  W. R. HAGGARD, JR  3,311,187
DRIVER CAPABILITY TESTER AND VEHICLE ANTI-THEFT DEVICE
Filed June 18, 1964

INVENTOR.
William R. Haggard, Jr.
BY
Hovey, Schmidt, Johnson & Hovey
ATTORNEYS.

United States Patent Office 3,311,187
Patented Mar. 28, 1967

3,311,187
DRIVER CAPABILITY TESTER AND VEHICLE ANTI-THEFT DEVICE
William R. Haggard, Jr., 5113 E. Barry Road, Kansas City, Mo. 64156
Filed June 18, 1964, Ser. No. 376,077
9 Claims. (Cl. 180—82)

This invention relates to apparatus for preventing operation of a vehicle by unauthorized or incapacitated persons and, more specifically, to apparatus for prohibiting the starting of the engine of a vehicle unless the driver exhibits a certain degree of manual dexterity and visual capability.

The instant invention is primarily directed to a means for preventing intoxicated persons from driving an automobile. Manifestly, the problem of drunken drivers is of great concern to the various legislative bodies in this country, as well as interested individuals everywhere. Although certain steps have been taken to alleviate this problem and bring those to justice who violate the laws of the road, the problem of the intoxicated driver is still a great one indeed.

Secondarily, this invention is concerned with the prevention of auto theft or operation of any vehicle by unauthorized persons for any reason. This again is an ever present problem in spite of the long and continuing use of keylocks and other devices to discourage the use of vehicles by unauthorized persons.

With the foregoing in mind, therefore, it is the primary object of this invention to provide apparatus for preventing unauthorized or incapacitated persons from operating a vehicle through the use of means which requires that the operator be aware of a predetermined code or number, have knowledge of the operating sequence of the apparatus, and have sufficient manual dexterity and visual capability to effectively operate the same.

It is another important object of this invention to provide such apparatus that normally disables an operating circuit within the vehicle and which, upon proper manipulation of the controls thereof, renders the circuit operative to permit starting of the engine.

Still another important object of the instant invention is to provide apparatus as aforesaid which will require the vehicle operator to perform the necessary manual dexterity control functions within a predetermined period of time.

Yet another important object of the invention is to provide apparatus as aforesaid which will disable the starting circuit of the vehicle until the driver demonstrates his capability but which, after starting is effected, will not prevent immediate re-starting in the event of an engine failure.

Other objects will become apparent as the detailed description proceeds.

Figure 1:
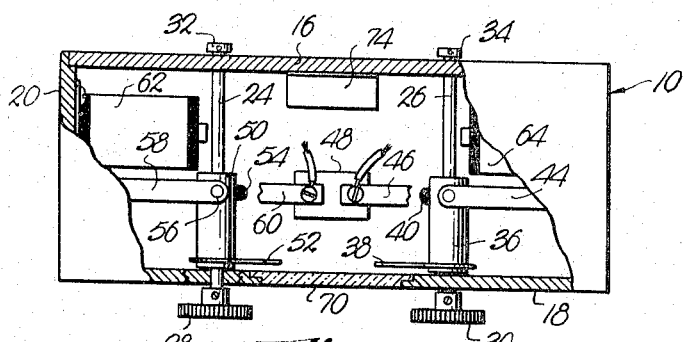
FIGURE 1 is a top plan view of the apparatus, a portion of the housing being broken away to reveal details of construction.

A housing for the apparatus is generally designated 10 and includes a base 12, a top 14, a rear wall 16, a front panel 18, and opposed end walls 20 and 22. A pair of manually rotatable shafts 24 and 26 extend through front panel 18 and end wall 16 and are journaled therein.

Shafts 24 and 26 are respectively provided with knurled knobs 28 and 30 which are attached to the ends of the shafts extending through front panel 18. Retainers 32 and 34 are secured to the opposite ends of shafts 24 and 26 adjacent the outer face of rear wall 16.

A sleeve 36 is rotatably mounted on shaft 26 and has a pointer 38 rigidly secured thereto and extending radially therefrom. Sleeve 36 is also provided with an electrically conductive actuator or cam 40 in the form of a protuberance extending from the outer surface thereof. Upon rotation of sleeve 36, actuator 40 is employed to close a set of normally open contacts 42. Contacts 42 are mounted on conductive contactor arms 44 and 46, arm 44 being secured to end wall 22 and insulated therefrom, while arm 46 extends from an insulated standard 48 mounted on base 12.

A sleeve 50 is rotatably mounted on shaft 24 and carries component parts, pointer 52 and actuator 54, of identical construction to that as shown and described for sleeve 36. Actuator 54, upon rotation of sleeve 50, operates to close a set of normally open contacts 56 mounted on contactor arms 58 and 60. Contactor arm 58 is secured to end wall 20 but need not be insulated therefrom, arm 60 being supported by standard 48 in the same fashion as arm 46.

A pair of electromagnets 62 and 64 are mounted on end walls 20 and 22 respectively and extend into close proximity to sleeves 50 and 36. Shafts 24 and 26 and sleeves 50 and 36 are composed of a ferromagnetic substance, the shafts normally being free to rotate within the sleeves. However, a pole of each electromagnet is disposed adjacent the corresponding sleeve and shaft so that, upon energization of the magnets, the shaft-sleeve combinations will function as a unit, rotation of knobs 28 and 30 then causing pointers 52 and 38 to swing.

Normally, with electromagnets 62 and 64 de-energized, pointers 52 and 38 are in their normal positions as illustrated. Eccentric weights 66 and 68 attached to sleeves 50 and 36, respectively, maintain the pointers in the positions shown until the electromagnets are energized and the knobs are rotated. To localize the magnetic field, shafts 24 and 26 may each be divided into two sections at a point intermediate the ends of the respective sleeves and interconnected by a nonmagnetic substance, such as lead or solder (not shown). A transparent dial plate 70 is mounted in a rectangular opening in front panel 18 so that the positions of the pointers may be seen. It may be noted in FIG. 2 that the dial is graduated so as to indicate the position of the left-hand pointer 52.

A relay 74 is mounted on rear wall 16 and serves to energize the starting circuit of the vehicle when the apparatus is properly manipulated by the driver, as will be fully explained hereinafter. Relay 74 is only diagrammatically illustrated in the plan view of FIG. 1.

Figure 4:
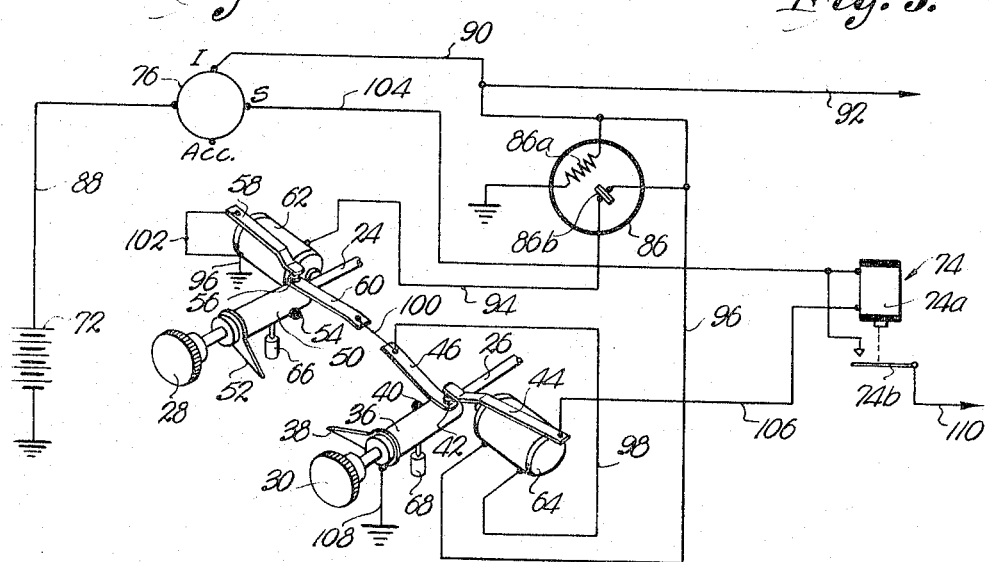
FIG. 4 is a combination diagrammatic, perspective view and electrical schematic showing the apparatus connected with the ignition and starting circuits of a vehicle.

In FIG. 4 the various components of the apparatus are shown in electrically coupled relationship to one another and the ignition and starting circuits of a vehicle. Components of the vehicle include a battery 74 and a key turn ignition and starter switch 76. Key turn switches are conventional and widely used on vehicles, particularly automobiles, and include "ignition," "start," and "accessory" positions which may be selected by rotating the ignition key. These various positions are respectively designated I, S, and Acc.

A thermal time delay tube 86 forms a part of the instant invention and includes a filament 86a and a set or normally closed contacts 86b. A power circuit from the positive terminal of battery 72 energizes filament 86a when switch 76 is operated by the vehicle key and placed in the I position. This circuit includes lead 88 from battery 72 to switch 76, from the I terminal of switch 76 along lead 90 to filament 86a, and thence through the filament to ground. Note that a lead 92 connects with lead 90, lead 92 forming a part of the ignition circuit (not shown) of the vehicle. Normally, lead 92 would, for example, be coupled with the distributor. It should be understood that tube 86 is a conventional electrical device, contacts 86b being normally closed but opening after filament 86a heats for a predetermined period of time.

Figure 2:
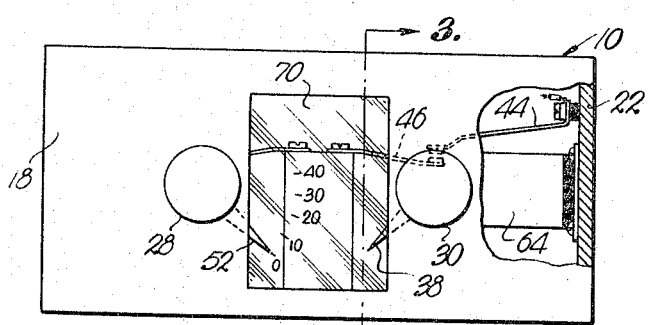
FIG. 2 is a front view of the apparatus, a portion of the housing being broken away to reveal the interior thereof.
Figure 3:
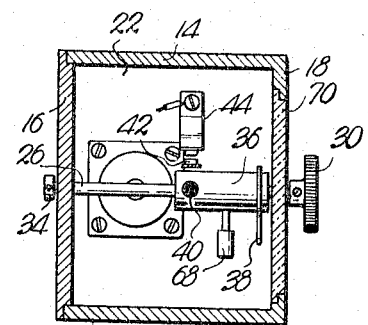
FIG. 3 is a sectional view taken along line 3—3 of FIG. 2.

For clarity of illustration, device 86 is not shown in FIGS. 1–3, nor are the various electrical leads in their entireties. Furthermore, it should be understood that a dial light may be added to the apparatus to aid the driver in reading the dial at night.

In operation, the apparatus may be mounted on the steering post of the vehicle by any suitable means or, alternatively, it may form a part of the dashboard or be suspended therebelow at a convenient location. An authorized driver entering the vehicle will be aware of the position of pointer 52 which is required for closing of the contacts 56 on contactor arms 58 and 60. In the instant illustration, the dial is not calibrated for pointer 38, it being understood by an authorized driver that pointer 38 must be moved to the same angular position as pointer 52 in order to effect starting of the vehicle. Furthermore, the authorized driver will be aware that pointer 52 must be set at the proper position prior to adjusting knob 30 and setting pointer 38. This will become clear in the paragraphs to follow.

Assuming, for example, that pointer 52 must be moved to the number 40 on the dial, the driver first closes the ignition circuit of the vehicle by turning the key to the I position of switch 76, thereby intercoupling leads 88 and 90. Knob 28 is then manipulated to properly set pointer 52. It will be appreciated that, upon closure of the ignition circuit through lead 90, current flows from battery 72, along lead 90 to contacts 86b, and then along lead 94 and through electromagnet 62 to ground at 96. This energizes electromagnet 62 to thereby intercouple shaft 24 and sleeve 50. Thus, rotation of knob 28 will not effect rotation of the sleeve to, in turn, swing pointer 52 to the desired setting. After the operator of the vehicle has moved pointer 52 to 40 on the dial, knob 30 may now be rotated to adjust the disposition of pointer 38 since electromagnet 64 is now energized. This occurs by way of the following circuit: from battery 72 through switch 76 to lead 90, along lead 90 to lead 96, along lead 96 to electromagnet 64, through electromagnet 64 and along lead 98 to contactor arm 46, along lead 100 to contactor arm 60, through now closed contacts 56 to contactor arm 58, and along lead 102 to ground at 96.

The vehicle operator, with knowledge that pointer 38 must be visually aligned with pointer 52 at the same angular setting, may then adjust knob 30 to so position pointer 38 since shaft 26 and sleeve 36 are now intercoupled by the magnetic field of the electromagnet 64. When pointer 38 is properly set, actuator 40 on sleeve 36 will close contacts 42, permitting starting of the vehicle by rotation of the key to the S position of switch 76 since the following circuit is now established: from battery 72 along lead 88 to lead 104 (upon rotation of the key to the S position of switch 76), along lead 104 to the coil 74a of relay 74, through coil 74a and along lead 106 to contactor arm 44, through the now closed set of contacts 42, and thence through actuator 40 to sleeve 36 and ground at 108. The energization of relay coil 74a closes its associated, normally open switch 74b, thereby interconnecting lead 110 with lead 110, the latter extending to the starting circuitry of the vehicle, such as the starter solenoid of a starter motor (not shown). It should be noted, however, that both the manipulation of knob 28 and knob 30 must be completed prior to the opening of contacts 86b since, at that time, power from battery 72 will no longer be available to electromagnet 62 and, therefore, knob 28 will be rendered inoperative.

In the foregoing example it was assumed that the operator was aware of the proper manner of operating the apparatus to effect starting of the vehicle. Manifestly, an unauthorized person would not be aware of this procedure and, therefore, would be precluded from using the vehicle.

If, on the other hand, the operator is authorized to use the vehicle but is intoxicated or incapacitated for some other reason, he still will be precluded from starting the vehicle engine. This is accomplished due to the fact that the vision of the operator must be sufficiently good to permit him to align pointer 52 with the proper graduation on the dial. Furthermore, in conjunction with the visual requirement, he must also be able to finely adjust knob 28 so that pointer 52 will point to the proper graduation. In this regard, it should be noted that the actuators 54 and 40 are rounded and the contacts 56 and 42 spaced so that the pointers must be very finely set in order to effect closure thereof.

Even assuming that an intoxicated driver is able to set pointer 52 properly, he then must do the same with pointer 38, and this is more difficult since there are no graduations on the right-hand side of the dial. Additionally, these various manipulations must all be completed prior to the opening of contacts 86b. Thus, it may be seen that an intoxicated driver is precluded from making trial and error adjustments until the proper combination is found. It is preferred that contacts 86b open in approximately 10 to 15 seconds.

It should be understood that, after contacts 86b open, pointer 52 returns to its normal position as shown, since electromagnet 62 then becomes de-energized and eccentric weight 66 is free to gravitate to a position directly beneath sleeve 50. This occurs whether or not starting of the vehicle has been effected. The condition of the other pointer 38 at this time will be determined by whether or not the driver has demonstrated his capability within the time delay period. If the knobs have been manipulated to permit energization of relay coil 74a, pointer 38 will be held in its set position with actuator 40 maintaining contacts 42 closed, since the power circuit for electromagnet 64 by-passes delay tube 86 and a holding circuit is formed through contacts 42 to ground connection 108. It should be understood that ground connection 108 is available since the chassis of the vehicle is utilized as the ground or return path for the circuit, housing 10 being electrically conductive and attached to the steering column or instrument panel as discussed above. Thus, connection 108 is purely diagrammatic in form and serves merely to illustrate that shaft 26 and its associated sleeve 36 are at ground potential.) If, on the other hand, the knobs have not been properly adjusted before contacts 86b open, then pointer 38 will also return to its normal position shown under the action of eccentric weight 68 since no holding circuit will be available through contacts 42.

Assuming that proper manipulation of knobs 28 and 30 has been effected within the alotted time period, the normal starting procedure for the vehicle may then be instituted even though contacts 86b ultimately, open, since relay coil 74a may be energized by placing switch 76 in the S position due to the presence of the holding circuit through contacts 42 discussed above. Furthermore, if the vehicle engine should fail for some reason, re-starting may be effected without adjusting knobs 28 and 30 since the operation of the ignition key in the I and S positions is in no way impaired. This is an important feature because a motor failure at an intersection or a railroad crossing would otherwise be extremely hazardous due to the time that would be consumed if it were necessary to manipulate knobs 28 and 30.

Once a trip is finished, however, and the key rotated to turn off the ignition, the driver is forced to demonstrate his capability before the vehicle can again be operated because pointer 38 will now be in its normal position as shown. This occurs since disconnection of leads 88 and 90 by operation of switch 76 breaks the power circuit to electromagnet 64. Sleeve 36 is thus free to turn on shaft 26 under the influence of weight 68, thereby re-opening contacts 42.

In order to assure that pointers 52 and 38 will remain where they are set and not return to their normal positions until the proper time, shafts 24 and 26 are mounted for rotation against sufficient friction to offset the tendency of the eccentric weights 66 and 68 to rotate the shaft-sleeve combinations as a unit after the pointers have been set to the proper positions to permit starting of the engine. Thus, as long as the electromagnets remain energized, knobs 28 and 30 may be released and the pointers will remain stationary. However, each pointer will immediately return to its normal position when the associated magnetic field is removed, since the sleeve to which it is attached will then be free to rotate on the respective shaft under the influence of its eccenrtic weight.

Having thus described the invention, what is claimed as new and desired to be secured by Letters Patent is:

1. Protective apparatus for preventing operation by unauthorized or incapacitated persons of a vehicle having electrical power supply means and an operating circuit, said apparatus comprising:
   a first electrical switch for controlling said operating circuit;
   first mechanically shiftable structure movable to a number of different positions and disposed to operate said first switch when said first structure is shifted to one of said positions;
   means operably associated with said first structure for indicating the position thereof;
   first manually shiftable means,
   first electrically responsive means for coupling said first shiftable means with said first structure to effect controlled positioning of the latter by said first shiftable means during manual movement thereof;
   a second electrical switch for coupling said first electrically responsive means with said power supply means;
   second mechanically shiftable structure movable to a number of different positions and disposed to operate said second switch when said second structure is shifted to one of said positions thereof;
   means operably associated with said second structure for indicating its position;
   second manually shiftable means;
   second electrically responsive means for coupling said second shiftable means with said second structure to effect controlled positioning of the latter by said second shiftable means during manual movement thereof; and
   circuit means for coupling said second electrically responsive means with said power supply means, whereby the operator of the vehicle is required to adjust the second and the first shiftable means, in that order, to set the second and the first structures at the one position of each in order to operate the vehicle.

2. The invention of claim 1, wherein is provided timer means interposed in said circuit means for interrupting the latter after a predetermined period of energization of said second electrically responsive means, whereby to require the operator to set the second and first structures at the one position of each within said predetermined time period.

3. The invention of claim 2, wherein each of said structures is proivded with means returning the associated structure to a normal position upon decoupling of the same from the corresponding manually shiftable means, and wherein is provided a holding circuit including said first structure for coupling said first electrically responsive means with said power supply means when said first structure is set at said one position thereof.

4. The invention of claim 1, wherein said power supply means includes a manually operable switch for selectively controlling current flow therefrom, each of said first and second structures being provided with means returning the associated structure to a normal position upon decoupling of the same from the corresponding manually shiftable means, whereby to require setting of the structures at the one position thereof prior to each operation of the vehicle.

5. The invention of claim 1, wherein said indicating means for the first structure and said indicating means for the second structure comprise a pointer rigid with each of the structures respectively for movement therewith during shifting of the structures, and a dial operably associated with the pointers and graduated to indicate the position of at least one of the pointers.

6. The invention of claim 1, wherein each of said first and second shiftable means includes a rotatable magnetic shaft, said first and second structures being magnetic and rotatably mounted on respective shafts, each of said first and second electrically responsive means comprising an electromagnet disposed to mutually attract the associated shaft and structure to intercouple the same upon energization thereof.

7. The invention of claim 6, wherein each of said first and second structures is provided with an eccentric weight maintaining the associated structure at a normal position different from said one position thereof when the corresponding electromagnet is de-energized, and wherein is provided means mounting each of said shafts for rotation against sufficient friction to offset the tendency of each weight to return the corresponding structure to its normal position upon movement by the associated shaft while the corresponding electromagnet is energized whereby, upon de-energization of the electromagnets, the structures automatically return to their normal positions.

8. The invention of claim 6, wherein is provided timer means interposed in said circuit means for interrupting the latter after a predetermined period of energization of the electromagnet of said second electrically responsive means, whereby to require the operator to set the second and first structures at the one position of each within said predetermined time period.

9. Protective apparatus for preventing operation by unauthorized or incapacitated persons of a vehicle having an ignition circuit and a starting circuit, said apparatus including:
   first electrical contact means having an open position and a closed position, said contact means normally being in one of said positions;
   first actuator means movable into engagement with said first contact means to cause the latter to assume the other of said positions;
   a first manually rotatable shaft for shifting said first actuator means into engagement with said first contact means;
   means adapted to be coupled with said ignition circuit for intercoupling said first actuator means and said first shaft when the ignition circuit is rendered operative, whereby movement of the shaft to a predetermined disposition causes said first contact means to assume said other position;
   control means adapted for coupling with said starting circuit including second electrical contact means having a first, normal contact position disabling said starting circuit and a second contact position for rendering said starting circuit operative;
   second actuator means movable into engagement with said second contact means to cause the latter to assume said second position;

a second manually rotatable shaft for shifting said second actuator means into engagement with said second contact means; and means coupled with said first contact means and responsive to the placing of the latter in said other position for intercoupling said second shaft and said second actuator means, whereby movement of the second shaft to a preselected disposition causes the second contact means to assume said second position.

References Cited by the Examiner

UNITED STATES PATENTS

| | | | |
|---|---|---|---|
| 2,819,770 | 1/1958 | Gibbs | 180—82 |
| 2,897,376 | 7/1959 | Rieckman | 307—10 |

FOREIGN PATENTS

| | | |
|---|---|---|
| 252,465 | 7/1963 | Australia. |

KENNETH H. BETTS, *Primary Examiner.*